July 24, 1962 G. L. CLAPPER 3,046,413

TRANSISTOR MULTIPLE COUNT TRIGGER WITH STEPWAVE GENERATOR GATES

Filed Dec. 16, 1960

INVENTOR
GENUNG L. CLAPPER

BY G. R. Gugger

AGENT 3,046,413
Patented July 24, 1962

3,046,413

TRANSISTOR MULTIPLE COUNT TRIGGER WITH STEPWAVE GENERATOR GATES

Genung L. Clapper, Vestal, N.Y., assignor to International Business Machines Corporation, New York, N.Y., a corporation of New York Filed Dec. 16, 1960, Ser. No. 76,263
8 Claims. (Cl. 307—88.5)

This invention relates to a multiple count trigger and more particularly to a binary transistor trigger which is provided with a special gate at each trigger input, which gates function as stepwave generators for operating the trigger on a multiple count decimal system.

It is well known that many electronic computer applications make use of stepwave generators in connection with frequency dividers, multiple count counters, and the like where one output pulse is desired which is a function of a predetermined number of input pulses. In the stepwave generator the generated voltage or current increases or decreases in small increments at spaced intervals and the application of such a generator to produce, for example, a high speed transistor multiple count system normally requires a substantial number of relatively expensive and critical high speed transistors. In the present improved circuit, the basic Eccles-Jordan binary transistor trigger is adapted to the multiple count system by the use of special gates at each trigger input. The gates generate a stepwave or staircase function from a series of input pulses so that every fourth, fifth, or sixth pulse will operate the trigger and thus, a count cycle of eight, ten, or twelve is produced.

In the preferred embodiment, each gate counts five input pulses to "on" and "off." When the trigger turns "on" the second time, a full count cycle of ten has taken place. The use of the sub-cycle of five counts allows greater tolerance on the components and parameters. A further advantage of the present circuit resides in the fact that the gates operate alternately, that is, while one is counting on an ascending staircase the other is resetting on a descending voltage waveform. As a result, the reset time, which in a normal staircase circuit would be wasted, takes place during the other subcycle. Therefore, the present circuit allows a longer reset time or the circuit may be run at a faster rate.

Accordingly, a principal object of the present invention is to provide an improved multiple count transistor trigger which is both economical and capable of high speed operation.

A further object of the present invention is to provide a binary transistor trigger which is provided with a special gate at each trigger input, which gates function as stepwave or staircase generators for operating the trigger on a multiple count decimal system.

A still further object of the present invention is to provide a multiple count decimal system as in the preceding object and wherein the gates operate alternately so that while one is counting on an ascending staircase, the other is resetting on a descending voltage waveform.

The foregoing and other objects, features and advantages of the invention will be apparent from the following more particular description of a preferred embodiment of the invention, as illustrated in the accompanying drawings.

Figure 1:
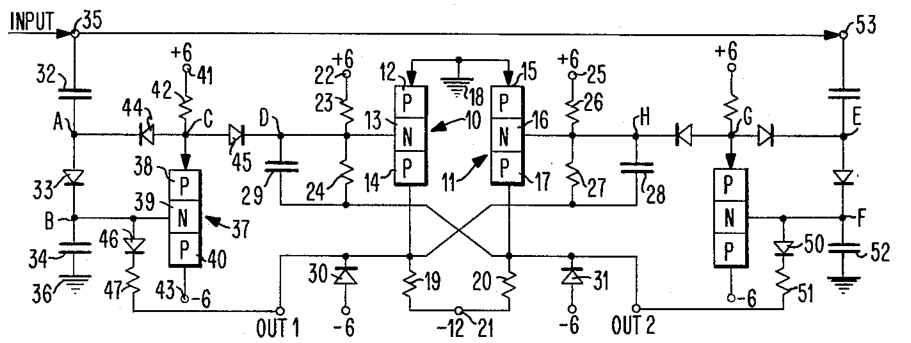
FIG. 1 is a schematic circuit diagram of a multiple count transistor trigger embodying the principles of the present invention.

Referring to FIG. 1, the basic Eccles-Jordan binary trigger is shown as comprising the two cross-coupled PNP type junction transistors 10 and 11. Transistor 10 comprises an emitter electrode 12, base electrode 13 and collector electrode 14 and transistor 11 comprises an emitter electrode 15, base electrode 16 and collector electrode 17. The emitter electrodes are shown connected in common to a source of ground potential 18 and the collector electrodes through their respective resistors 19 and 20 are connected in common to a negative 12 volt terminal 21. A voltage divider biasing network comprising the positive 6 volt terminal 22 and the resistors 23, 24 is connected to the base electrode of transistor 10 and a similar voltage divider biasing network comprising the positive 6 volt terminal 25 and the resistors 26, 27 is connected to the base electrode of transistor 11. Cross coupling between the collector of transistor 10 and the base of transistor 11 and vice versa is effected by the coupling capacitors 28 and 29, which, as is well known, will control the transistors 10 and 11 to assume opposite states of conductivity. The output from the collector of transistor 10 is taken from an OUT 1 terminal and the output from the collector of transistor 11 is taken from an OUT 2 terminal with these outputs being clamped at negative 6 volts by the respective clamping diodes 30 and 31.

There has been described thus far the basic trigger portion of the circuit. As was previously mentioned, in accordance with the present invention a special gate circuit is provided at each trigger input, in other words, to the base of transistor 10 and to the base of transistor 11, and since both gate circuits are identical only the gate circuit for transistor 10 will be described in detail.

As shown in FIG. 1, the gate circuit for transistor 10 comprises in part a so called well and bucket combination which consists of an input capacitor 32, a diode 33 and a storage capacitor 34 connected in series in the order between an input pulse terminal 35 and a source of ground potential 36 by way of the junction points A and B. Capacitor 34 is the well of the combination and for a multiple count trigger having a full count cycle of ten, the capacitor 34 is given a value which is approximately four times larger than the value of the input capacitor 32. As will be seen, the individual charges placed on capacitor 32 by a train of input pulses will be stored on capacitor 34, capacitor 34 serving to establish a raised level of potential for each input pulse to produce a staircase function.

The gate circuit also includes a feedback circuit portion which comprises a PNP junction type transistor 37 having an emitter electrode 38, a base electrode 39, and a collector electrode 40. Transistor 40 is arranged as an emitter follower with its emitter connected to a positive 6 volt terminal 41 by way of resistor 42 and its collector connected to a negative 6 volt terminal 43. The base electrode is shown connected to junction point B and capacitor 34 and the emitter electrode is shown further connected to junction point A and capacitor 32 by way of junction point C and a diode 44. Junction point C is the threshold point of the circuit and this is coupled to the base electrode of transistor 10 by way of a diode 45 and junction point D. The purpose of the emitter follower feedback circuit is to provide for equal staircase increments. As will be seen, the potentials at junction points A, B, and C will all rise incrementally as the input pulses are received.

Finally, the gate circuit includes a shunt circuit for the emitter follower transistor which comprises a diode 46 and resistor 47 connected in series between the base electrode of the emitter follower and the collector electrode of the trigger transistor 10. The purpose of the shunt circuit is to effect alternate operation of the gate circuit so that during one-half of the full count cycle the gate will count into its half of the trigger on an ascending staircase and during the other half of the full count cycle will reset its half of the trigger on a descending voltage waveform.

Figure 2:
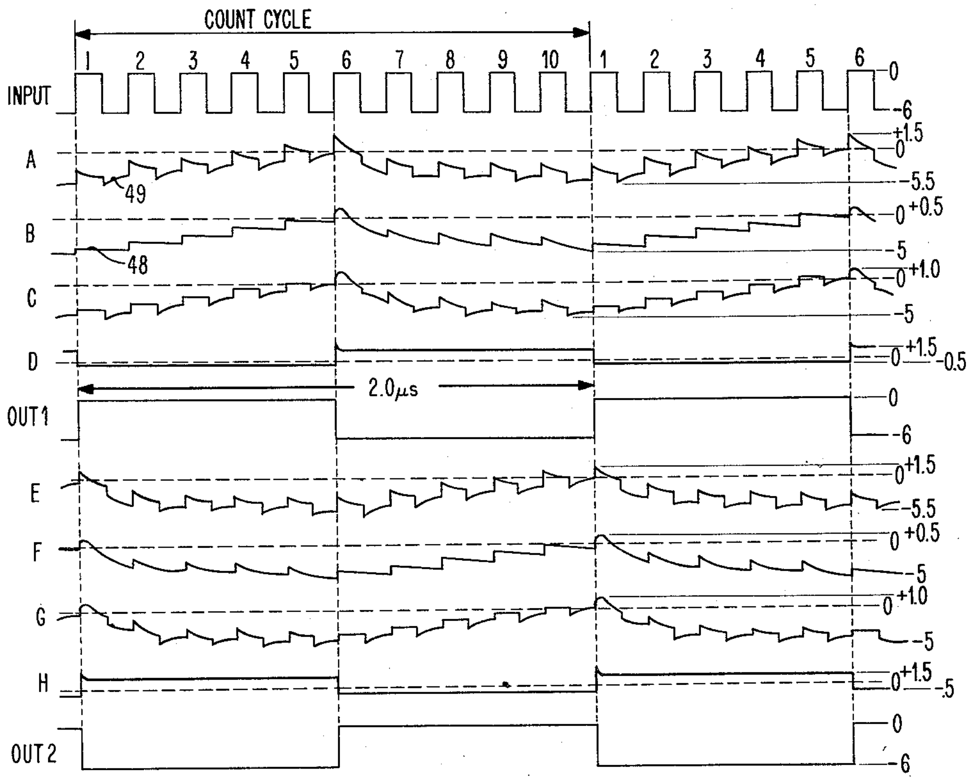
FIG. 2 is a waveform diagram illustrating the operation of the circuit of FIG. 1.

In the operation of the circuit, a train of input pulses, such as is shown at the top of FIG. 2, is applied to the input terminal 35 and the leading edge of the first pulse places a charge on capacitor 32 which causes the potential at point A to rise. Displacement current will now flow from point A through the diode 33 to point B and the potential at point B will rise slightly to a value which is proportionate to the value of the capacitor 32 divided by the sum of the values of both capacitors 32 and 34. For the particular full count cycle of 10, chosen here for illustrative purposes, the above circuit is designed such that the small rise at point B will place a charge on capacitor 34 which will be one-fifth the total charge required to flip the trigger, as shown by the first step of waveform 48 in FIG. 2.

The emitter follower transistor 37 is normally biased on so that the small rise at B is reflected at point C, since C will tend to follow B. When C rises the diode 44 becomes forward biased and on the negative going edge of the first input pulse current will flow from the positive 6 volt terminal 41, point C, the diode 44, point A, and capacitor 32 to the input. This feedback current is provided to raise the potential at point A back up, as shown in the waveform 49 on FIG. 2, and now when the leading edge of the second pulse comes along the reference potential at point A is at the raised level and the staircase function is produced with the raised level being reflected at points B and C. In the manner just described for the first input pulse, the potential at the points A, B and C will all rise incrementally as the individual input pulses come in with the staircase increments being maintained equal by the feedback current supplied to point A. The base current flowing in transistor 37 compensates for the loss in diode 33 when the input pulse goes negative with the transistor functioning to hold point C fairly fixed in level with point B to establish a linear charging factor.

As shown in FIG. 2, during the first half of the full count cycle, the potential at point D is slightly below ground and the trigger transistor 10 is biased into conduction. The resulting positive potential at the collector of transistor 10 is coupled by way of resistor 27 in parallel with capacitor 28 to point H to maintain the trigger transistor 11 biased off and the negative potential at the collector of transistor 11 is coupled back to the base electrode 13 through resistor 24 in parallel with capacitor 29 to insure conduction of transistor 10. In this condition the trigger is considered turned on and the output of the trigger assumes a level of 0 volts at the OUT 1 terminal and a level of negative 6 volts at the OUT 2 terminal.

As the input pulses come in to terminal 35, the individual charges on capacitor 34 are stored and the potentials at points B and C incrementally rise from negative 5 volts. Upon receipt of the fifth input pulse the potentials at A, B and C will arrive at the 0 volt level which is the threshold value of the gating circuit. As seen in FIG. 2, the leading positive edge of the sixth input pulse will drive points A, B and C over the threshold and the positive one volt potential now at point C will forward bias the gating diode 45 and current will flow from point C to point D to cut off transistor 10. The trigger will flip off with transistor 11 going into conduction and with the output level at the OUT 2 terminal rising to 0 volts and the output level at the OUT 1 terminal dropping to a negative 6 volts. Thus, the flipping of the trigger off indicates that the left-hand gate circuit has counted five input pulses to complete the first half of the full count cycle and that now the left-hand gate circuit should be reset while the right-hand gate circuit counts the next five input pulses to complete the full cycle.

Before discussing the remainder of the cycle, it will be noted in FIG. 2 that during the first half of the cycle the right-hand gate circuit was being reset on a descending voltage waveform while the left-hand gate was counting using an ascending staircase. As was previously mentioned, this is accomplished by the shunting diode 46 and resistor 47 connected to the OUT 1 terminal and a similar shunting diode 50 and resistor 51 connected to the OUT 2 terminal. During this first half cycle the potential at the OUT 1 terminal is at 0 volts and thus the diode 46 is reverse biased to enable the individual charges from the input impulses to be stored by capacitor 34 so that the ascending staircase can be developed. During the same period however, the OUT 2 terminal is at negative 6 volts and the diode 50 is forward biased. As a result, the charge accumulated on the capacitor 52 from the previous count cycle is now bled off through the diode 50 and the potential at points G, E and F is gradually dropped to reset the right side of the trigger circuit. During the resetting the right-hand gate circuit continues to receive input pulses at terminal 53, however, the resulting charges on the capacitor 52 are immediately bled off and the descending voltage waveform cannot flip the trigger since the diode between points G and H is reversed biased. Hence, both gate circuits are continuously operative during both the count half and the reset half of each cycle so that they are immediately effective whenever the trigger flips and no turn-on time or the like is required.

The flipping off of the trigger after the fifth input pulse initiates the second half of the count cycle with the potential at the OUT 1 terminal now at negative 6 volts and the potential at the OUT 2 terminal at 0 volts. Accordingly, the diode 46 is now forward biased to discharge the capacitor 34 and effect resetting while the diode 50 is now reverse biased to allow capacitor 52 and its gate circuit to develop an ascending staircase in response to the next five input pulses in the same manner as described for the left-hand gate circuit. After the tenth input pulse, the leading positive edge of the next input pulse will flip the trigger back on indicating that a full count cycle has been taken and that ten input pulses have been counted. The trigger is also immediately ready to start a second full count cycle for the next ten input pulses.

The use of the sub-cycle of five counts allows greater tolerance on the components and parameters. In fact, the present circuit described for a count of ten may be operated at 5.0 megacycles using economical transistors as, for example, of the type 2N393. Other frequencies and counts may be used by suitable changes in the time constants.

While the invention has been particularly shown and described with reference to a preferred embodiment thereof, it will be understood by those skilled in the art that various changes in form and details may be made therein without departing from the spirit and scope of the invention.

What is claimed is:

1. A multiple count trigger of the class described comprising, a pair of transistors each having emitter, base and collector electrodes, means cross-coupling the collector of each of said transistors with the base of the other transistor to form a binary trigger, a source of input pulses, an individual gating circuit connected between each base electrode of said binary trigger and said source of input pulses, means included in each said gate circuit and responsive to said input pulses for generating staircase voltages proportionate to the number of input pulses received, and control means responsive to the collector outputs of said binary trigger for effecting opposite control of said staircase voltage generating means whereby one gating circuit will count into one side of the trigger using an ascending staircase voltage while the other gating circuit is being reset using a descending voltage waveform.

2. A multiple count trigger of the class described comprising, a pair of transistors each having emitter, base and collector electrodes, means cross-coupling the collector of each of said transistors with the base of the other transistor to form a binary trigger, a source of input pulses, an individual gating circuit connected between each base electrode of said binary trigger and said source of input pulses, storage means included in each said gate circuit and responsive to said input pulses for developing staircase voltages proportionate to the number of input pulses received, said staircase voltages serving to control flipping of said binary trigger upon reaching a predetermined threshold value, and an individual control circuit connecting each gating circuit to the collector electrode of its related transistor of the binary trigger, said control circuits being responsive to the collector outputs of said binary trigger for effecting alternate operation of said gating circuits whereby one gating circuit will develop an ascending staircase voltage to count into one side of the trigger while the other gating circuit will be reset by a descending voltage waveform.

3. A multiple count trigger of the class described comprising, a pair of transistors each having emitter, base and collector electrodes, means cross-coupling the collector of each of said transistors with the base of the other transistor to form a binary trigger, a source of input pulses, an individual gating circuit connected between each base electrode of said binary trigger and said source of input pulses, a storage condenser circuit included in each said gate circuit and responsive to said input pulses for developing staircase voltages proportionate to the number of input pulses received, said staircase voltages serving to control flipping of said binary trigger upon reaching a predetermined threshold value, and an individual diode control circuit connecting each condenser circuit to the collector electrode of its related transistor of the binary trigger, said diode circuits being responsive to the collector outputs of said binary trigger for effecting opposite operation of said condenser circuits whereby one gating circuit will develop an ascending staircase voltage to count into one side of the trigger while the other gating circuit will be reset by a descending voltage waveform.

4. A multiple count trigger of the class described comprising, a pair of transistors each having emitter, base and collector electrodes, means cross-coupling the collector of each of said transistors with the base of the other transistor to form a binary trigger with said transistors assuming opposite states of conductivity, a first condenser storage circuit responsive to said input pulses for generating a staircase voltage, a first gate circuit for coupling a predetermined value of said generated staircase voltage into the base electrode on one side of said trigger, a second condenser storage circuit responsive to said input pulses for generating a second staircase voltage, a second gate circuit for coupling a predetermined value of said second generated staircase voltage into the base electrode on the other side of said trigger, a first diode control circuit connected between the collector electrode on one side of said trigger and the associated condenser storage circuit, and a second diode control circuit connected between the collector electrode on the other side of said trigger and its associated condenser storage circuit, the diode control circuit connected to the conducting side of said trigger being effective to control the related condenser storage circuit to generate an ascending staircase voltage for counting into its side of the trigger and the diode control circuit connected to the non-conducting side of said trigger being effective to control the related condenser storage circuit to generate a descending voltage waveform for resetting.

5. A multiple count trigger as defined in claim 4 wherein each said gate circuit includes a current feedback circuit to the related condenser circuit to provide for equal increments of staircase voltage.

6. A multiple count trigger as defined in claim 4 wherein an emitter-follower transistor circuit is connected between each said condenser storage circuit and the related gate circuit for establishing a linear charging factor.

7. A multiple count trigger of the class described comprising, a pair of transistors each having emitter, base and collector electrodes, means cross-coupling the collector of each of said transistors with the base of the other transistor to form a binary trigger with said transistors assuming opposite states of conductivity, a source of input pulses, and an individual gating circuit connected between each base electrode of said binary trigger and said source of input pulses, each said gating circuit including a coupling condenser, a diode and a storage condenser connected in that order in series between said input pulse source and a source of ground potential for generating a staircase voltage, a transistor having emitter, base and collector electrodes and arranged in an emitter-follower configuration, said storage condenser being connected to the base electrode of said emitter-follower, a diode connected between the emitter electrode of said emitter-follower and said coupling condenser for supplying feedback current to said storage condenser, and a gating diode connected between the emitter electrode of said emitter-follower and the base electrode of one of said binary transistors for coupling a predetermined value of staircase voltage to one input of said binary trigger to effect flipping of same.

8. A multiple count trigger as defined in claim 7 and including a diode connected between the collector electrode of each binary transistor and the storage condenser of the related gating circuit, the diode connected to the collector of the conducting half of the binary trigger being reverse-biased to allow its related storage condenser to generate an ascending staircase voltage for counting into the conducting side of the trigger, and the diode connected to the collector of the non-conducting half of the binary trigger being forward-biased to discharge its related storage condenser whereby a descending voltage waveform is generated for resetting the gating circuit in preparation for the next count cycle.

References Cited in the file of this patent

UNITED STATES PATENTS 2,903,604 Henkle ---------------- Sept. 8, 1959